(12) United States Patent
Kang et al.

(10) Patent No.: US 11,496,737 B2
(45) Date of Patent: Nov. 8, 2022

(54) IMAGE ENCODING/DECODING METHOD AND APPARATUS, AND RECORDING MEDIUM STORING BITSTREAM

(71) Applicants: Electronics and Telecommunications Research Institute, Daejeon (KR); RESEARCH & BUSINESS FOUNDATION SUNGKYUNKWAN UNIVERSITY, Suwon-si (KR)

(72) Inventors: Jung Won Kang, Daejeon (KR); Ha Hyun Lee, Seoul (KR); Sung Chang Lim, Daejeon (KR); Jin Ho Lee, Daejeon (KR); Hui Yong Kim, Daejeon (KR); Byeung Woo Jeon, Seongnam-si (KR); Jee Yoon Park, Seoul (KR)

(73) Assignees: Electronics and Telecommunications Research Institute, Daejeon (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 17/282,720

(22) PCT Filed: Oct. 4, 2019

(86) PCT No.: PCT/KR2019/013006
§ 371 (c)(1),
(2) Date: Apr. 2, 2021

(87) PCT Pub. No.: WO2020/071836
PCT Pub. Date: Apr. 9, 2020

(65) Prior Publication Data
US 2022/0007022 A1    Jan. 6, 2022

(30) Foreign Application Priority Data
Oct. 5, 2018    (KR) .......................... 10-2018-0119271

(51) Int. Cl.
*H04N 19/12*     (2014.01)
*H04N 19/176*    (2014.01)
(Continued)

(52) U.S. Cl.
CPC ........... *H04N 19/12* (2014.11); *H04N 19/176* (2014.11); *H04N 19/46* (2014.11); *H04N 19/619* (2014.11)

(58) Field of Classification Search
USPC .................................................... 375/240.02
See application file for complete search history.

(56) References Cited

U.S. PATENT DOCUMENTS

| 2012/0082231 A1 | 4/2012 | Rojals et al. |
| 2013/0114730 A1 | 5/2013 | Joshi et al. |

(Continued)

FOREIGN PATENT DOCUMENTS

| KR | 100772576 B1 | 11/2007 |
| KR | 1020140027932 A | 3/2014 |

(Continued)

*Primary Examiner* — Behrooz M Senfi
(74) *Attorney, Agent, or Firm* — William Park & Associates Ltd.

(57) ABSTRACT

The present specification discloses a method of decoding an image. The method of decoding an image according to the method includes: obtaining transform skip information of a current block from a bitstream; obtaining multiple transform selection information of the current block on the basis of the transform skip information from the bitstream; and performing inverse transform on the current block on the basis of the multiple transform selection information, wherein the multiple transform selection information is used to set each of a horizontal transform type and a vertical transform type.

12 Claims, 16 Drawing Sheets

(51) Int. Cl.
    *H04N 19/46*    (2014.01)
    *H04N 19/61*    (2014.01)

(56)   References Cited

U.S. PATENT DOCUMENTS

| | | | |
|---|---|---|---|
| 2015/0172658 A1* | 6/2015 | Kim | H04N 19/593 |
| | | | 382/238 |
| 2016/0227253 A1 | 8/2016 | Sato | |
| 2018/0278958 A1* | 9/2018 | Hsiang | H04N 19/60 |
| 2019/0045198 A1* | 2/2019 | Mahdi | H04N 19/103 |
| 2020/0351511 A1* | 11/2020 | Ahn | H04N 19/60 |
| 2020/0366900 A1* | 11/2020 | Jun | H04N 19/159 |
| 2020/0404272 A1* | 12/2020 | Abe | H04N 19/176 |
| 2021/0227260 A1* | 7/2021 | Lee | H04N 19/60 |
| 2022/0007022 A1* | 1/2022 | Kang | H04N 19/12 |
| 2022/0086444 A1* | 3/2022 | Piao | H04N 19/46 |
| 2022/0109877 A1* | 4/2022 | Choi | H04N 19/625 |

FOREIGN PATENT DOCUMENTS

| | | |
|---|---|---|
| WO | 2001086962 A1 | 11/2001 |
| WO | 2013001279 A2 | 1/2013 |
| WO | 2018123644 A1 | 7/2018 |

\* cited by examiner

FIG. 8

| mts_cu_flag | mts_index | Transform Kernel | |
| --- | --- | --- | --- |
| | | Horizontal | Vertical |
| 0 | N/A | N/A | DCT2 | |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

FIG. 9

| mts_cu_flag | mts_index | Transform Kernel | |
| --- | --- | --- | --- |
| | | Horizontal | Vertical |
| 0 | N/A | N/A | DCT2 | |
| 1 | 0 | 0 | DCT8 | DCT8 |
| | 0 | 1 | DST7 | DCT8 |
| | 1 | 0 | DCT8 | DST7 |
| | 1 | 1 | DST7 | DST7 |

FIG. 10

```
residual_coding( x0, y0, log2TbWidth, log2TbHeight, cIdx ) {
    if( transform_skip_enabled_flag && ( cIdx != 0 || cu_mts_flag[ x0 ][ y0 ] == 0 )
        if( log2TbWidth <= 2 )
            transform_skip_flag_hor[ x0 ][ y0 ][ cIdx ]
        if( log2TbWidth <= 2 )
            transform_skip_flag_ver[ x0 ][ y0 ][ cIdx ]
    ...
```

FIG. 11

```
residual_coding( x0, y0, log2TbWidth, log2TbHeight, cIdx ) {
    if( transform_skip_enabled_flag && ( cIdx != 0 || cu_mts_flag[ x0 ][ y0 ] == 0 ) &&
        ( log2TbWidth <= 2 ) && ( log2TbHeight <= 2 ))
        transform_skip_flag[ x0 ][ y0 ][ cIdx ]
    ...
```

FIG. 12

| mts_cu_flag | mts_index | | Transform Kernel | |
|---|---|---|---|---|
| | | | Horizontal | Vertical |
| 0 | 0 | 0 | IDT | IDT |
| | 0 | 1 | IDT | DCT2 |
| | 1 | 0 | DCT2 | IDT |
| | 1 | 1 | DCT2 | DCT2 |
| 1 | 0 | 0 | DST7 | DST7 |
| | 0 | 1 | DCT8 | DST7 |
| | 1 | 0 | DST7 | DCT8 |
| | 1 | 1 | DCT8 | DCT8 |

FIG. 13

```
Parse mts_cu_flag
Parse mts_index
If (mts_index == 0) {
    transform_skip_flag_hor = 1;
    transform_skip_flag_ver = 1
}
If (mts_index == 1)
    transform_skip_flag_hor = 1
If (mts_index == 2)
    transform_skip_flag_ver = 1
```

FIG. 14

| mts_index | same_transform_hor_ver_flag = 1 | | same_transform_hor_ver_flag = 0 | |
|---|---|---|---|---|
| | Horizontal | Vertical | Horizontal | Vertical |
| 0 | DCT2 | | DST7 | DST8 |
| 1 | DCT8 | | DST8 | DST7 |
| 2 | DST7 | | DCT2 | IDT |
| 3 | IDT | | IDT | DCT2 |

FIG. 15

| same_transform_hor_ver_flag | mts_index | | Transform Kernel | |
|---|---|---|---|---|
| | | | Horizontal | Vertical |
| 0 | 0 | 0 | DST7 | DST7 |
| | 0 | 1 | DCT8 | DST7 |
| | 1 | 0 | DST7 | DCT8 |
| | 1 | 1 | DCT8 | DCT8 |
| 1 | 0 | 0 | DCT2 | |
| | 0 | 1 | DCT8 | |
| | 1 | 0 | DST7 | |
| | 1 | 1 | IDT | |

FIG. 16

| mts_cu_flag | same_transform_hor_ver_flag | mts_index | | Transform Kernel | |
|---|---|---|---|---|---|
| | | | | Horizontal | Vertical |
| 0 | - | - | | DCT2 | |
| 1 | 0 | 0 | 0 | DST7 | DST7 |
| | | 0 | 1 | DCT8 | DST7 |
| | | 1 | 0 | DST7 | DCT8 |
| | | 1 | 1 | DCT8 | DCT8 |
| | 1 | 0 | 0 | DCT8 | |
| | | 0 | 1 | DST7 | |
| | | 1 | 0 | IDT | |
| | | 1 | 1 | N/A | |

FIG. 17

```
If(mts_cu_flag == 0 ) {
    If(TU_size_condition_satisfied)
        Parse transformSkip_flag_hor and transformSkip_flag_ver
}
else {
    If(TU_size_condition_satisfied)
        Parse transformSkip_flag_hor and transformSkip_flag_ver
    If(transformSkip_flag_hor==0)
        Parse mts_hor_index
    If(transformSkip_flag_ver==0)
        Parse mts_ver_index
}
```

FIG. 18

```
If(mts_cu_flag == 0 ) {
    If(TU_Hor_size_condition_satisfied)
        Parse transformSkip_flag_hor
    If(TU_Ver_size_condition_satisfied)
        Parse transformSkip_flag_ver
}
else {
    If(TU_Hor_size_condition_satisfied)
        Parse transformSkip_flag_hor
    If(TU_Ver_size_condition_satisfied)
        Parse transformSkip_flag_ver
    If(transformSkip_flag_hor==0)
        Parse mts_hor_index
    If(transformSkip_flag_ver==0)
        Parse mts_ver_index
}
```

FIG. 19

```
If(TU_Hor_size_condition_satisfied)
    Parse transformSkip_flag_hor
If(TU_Ver_size_condition_satisfied)
    Parse transformSkip_flag_ver
if( !( transformSkip_flag_hor && transformSkip_flag_ver) )
    parse mts_cu_flag
    if ( mts_cu_flag ==0)
        use DCT2 for Horizontal and vertical directions
    else
        if(transformSkip_flag_hor ==0)
            parse mts_hor_idx
        if(transformSkip_flag_ver ==0)
            parse mts_ver_idx
```

FIG. 20

| TS_HOR_flag | TS_VER_flag | MTS possibility | mts_cu_flag transmission |
|---|---|---|---|
| 0 | 0 | possible | transmission |
| 0 | 1 | possible | transmission |
| 1 | 0 | possible | transmission |
| 1 | 1 | impossible | No transmission |

IMAGE ENCODING/DECODING METHOD AND APPARATUS, AND RECORDING MEDIUM STORING BITSTREAM

TECHNICAL FIELD

The present invention relates to a method and apparatus for encoding/decoding an image, more particularly, the present invention relates to a method and apparatus for encoding/decoding using selective transform.

BACKGROUND ART

Recently, the demand for high quality images, such as ultra high definition (UHD) images that can provide high resolution, wider color space, and excellent image quality is increasing in various applications.

As image data becomes higher resolution and higher quality, the amount of data thereof is relatively increased compared to that of the existing image data. Accordingly, when image data is transmitted using communication media such as wired/wireless broadband or various broadcasting medium such as satellite, terrestrial, IP network, wireless, cable, and mobile communication networks, or stored using various storage media such as CD, DVD, USB, and HD-DVD, the transmission cost and the storage cost increase.

In order to solve these problems, which are inevitably intensified as image data becomes high resolution and high quality, and to service images having higher resolution and image quality, an image encoding/decoding technique of high efficiency is required.

An image compression technology that has been developed or is being developed for this purpose, there are various techniques, such as an inter prediction technique for predicting pixel values included in a current picture from a picture before or after the current picture, an intra prediction technique for predicting pixel values included in the current picture using pixel information in the current picture, a transform and quantization technique for compressing energy of a residual signal remaining as a prediction error, and an entropy coding and arithmetic coding technique for assigning short codes to high-frequency values and long codes to low-frequency values, in which image data can be effectively compressed and transmitted or stored using such image compression techniques.

DISCLOSURE

Technical Problem

An objective of the present invention is to provide a method and apparatus for determining transform skip for each of the horizontal and vertical directions of a transform block.

An objective of the present invention is to provide a method and apparatus for encoding transform skip information determined for each of horizontal and vertical directions of a transform block.

An objective of the present invention is to provide a method and apparatus for decoding transform skip information encoded for each of horizontal and vertical directions of a transform block.

An objective of the present invention is to provide a method and apparatus for decoding compressed image information by performing or skipping transform independently for the horizontal and vertical directions according to the transform skip information for each of the decoded horizontal and vertical directions.

An objective of the present invention is to provide a method and apparatus for applying the above methods and apparatus independently or identically for each channel of an image.

It is an objective of the present invention to provide a method and an apparatus for selecting multiple transform or determining whether to skip or perform transform independently for each of the horizontal and vertical directions of a transform block.

An object of the present invention is to provide a signaling order of transform information for a block to be decoded for efficient transmission of a transform method.

An object of the present invention is to provide an encoding method and apparatus for performing the processes of transform skipping and multiple transform selection in each of the horizontal and vertical directions using whether to skip transform on all channels as a candidate for multiple transform selection.

An object of the present invention is to provide a method and an apparatus for transmitting the determination simultaneously with other transforms, skipping a flag indicating whether the transform is skipped and using the transform skipping as a candidate for multiple transform selection.

Technical Solution

A method of decoding an image according to an embodiment of the present invention, the method may comprise obtaining transform skip information of a current block from a bitstream; obtaining multiple transform selection information of the current block on the basis of the transform skip information from the bitstream; and performing inverse transform on the current block on the basis of the multiple transform selection information, wherein the multiple transform selection information is used to set each of a horizontal transform type and a vertical transform type.

In the method of decoding an image according to the present invention, wherein the multiple transform selection information indicates whether the horizontal transform type and the vertical transform type are the same.

In the method of decoding an image according to the present invention, wherein the multiple transform selection information is index information indicating a transform type set applied to the horizontal transform type and the vertical transform type.

In the method of decoding an image according to the present invention, wherein the acquiring of the transform skip information of the current block includes: obtaining transform skip information of the current block when a horizontal size and a vertical size of the current block are less than or equal to a predetermined size.

In the method of decoding an image according to the present invention, wherein the acquiring of the transform skip information of the current block includes: obtaining maximum transform skip size information from the bitstream; and obtaining transform skip information of the current block when the horizontal size and the vertical size of the current block are less than or equal to the maximum transform skip size.

In the method of decoding an image according to the present invention, wherein the transform skip information includes horizontal transform skip information and vertical transform skip information.

A method of decoding an image according to an embodiment of the present invention, the method may comprise obtaining transform selection information of a current block from a bitstream; determining whether to perform inverse transform on the current block and a transform type on the basis of the transform selection information; and performing inverse transform on the current block according to the determination.

In the method of decoding an image according to the present invention, wherein the inverse transform is secondary inverse transform performed between dequantization and primary inverse transform.

A method of encoding an image according to an embodiment of the present invention, the method may comprise determining whether to perform transform skip of the current block; when the transform skip is not performed on the current block, determining a horizontal transform type and a vertical transform type of the current block; performing the transform on the current block on the basis of the horizontal transform type and the vertical transform type; and encoding transform skip information indicating whether to perform the transform skip of the current block and multiple transform selection information indicating the horizontal transform type and the vertical transform type of the current block.

In the method of encoding an image according to the present invention, wherein the multiple transform selection information indicates whether the horizontal transform type and the vertical transform type are the same.

In the method of encoding an image according to the present invention, wherein the multiple transform selection information is index information indicating a transform type set applied to the horizontal transform type and the vertical transform type.

In the method of encoding an image according to the present invention, wherein the transform skip information of the current block is not encoded when the horizontal size and the vertical size of the current block are less than or equal to a predetermined size.

In the method of encoding an image according to the present invention, wherein the transform skip information includes horizontal transform skip information and vertical transform skip information.

A method of encoding an image according to an embodiment of the present invention, the method may comprise determining whether to perform transform on a current block and a transform type; performing the transform on the current block according to the determination; and encoding transform selection information indicating whether the transform is performed on the current block and a transform type.

In the method of encoding an image according to the present invention, wherein the transform is secondary transform performed between primary transform and quantization.

A non-transitory computer readable recording medium storing a bitstream decoded by an image decoding apparatus to an embodiment of the present invention, wherein the bitstream includes transform skip information of a current block and multiple transform selection information of the current block; the transform skip information indicates whether inverse transform is performed on the current block; the multiple transform selection information indicates a horizontal transform type and a vertical transform type applied to inverse transform of the current block; and the image decoding apparatus obtains the multiple transform selection information on the basis of the transform skip information.

Advantageous Effects

According to the present invention, by independently performing transform for each of the horizontal and vertical directions of a block, there is an effect that not only the encoding efficiency but also the image quality can be improved.

The present invention has the effect of improving the encoding efficiency and the image quality without additional signaling because the information for determining whether to perform the transform is signaled in combination with the multiple transform selection information.

According to the present invention, even when the change in the spatial pixel value is very large or very sharp in the corresponding block of the image to be compressed so that the energy of the image is not concentrated at low frequency even though transform is performed, and the low frequency component is mainly maintained and the high frequency component is removed or the quantization is strongly applied, in the compression process, thereby causing serious reduction of the image quality, there is an effect that the encoder can efficiently instruct to skip performing block transform for each of horizontal and vertical directions without a large overhead burden, thereby increasing the image compression rate and reducing the deterioration of image quality.

According to the present invention, an efficient transform method can be selected for each of the horizontal and vertical directions of each block in combination of the multiple transform selection process and the transform skip process.

According to the invention, a combination of transform skip and multiple transform can be used without additional flags by skipping signaling of the transform skip flag.

According to the present invention, it is possible to improve encoding and decoding efficiency of an image.

According to the present invention, it is possible to reduce the computational complexity of the encoder and the decoder of an image.

DESCRIPTION OF DRAWINGS

FIGS. 8 and 9 are diagrams illustrating an embodiment of a multiple transform technique.

FIGS. 10 and 11 are diagrams illustrating an embodiment of transform skip information.

FIGS. 12 and 13 are diagrams illustrating an embodiment in which a transform skip mode is represented by an identity matrix (IDT) without signaling transform skip information.

FIGS. 14 and 15 are diagrams illustrating various embodiments in which information indicating whether each of the horizontal transform and the vertical transform use the same transform kernel is used.

FIG. 16 is a diagram illustrating an embodiment of using both information (mts_cu_flag) indicating whether to use multiple transforms and information (same_transform_hor_ver_flag) indicating whether the horizontal transform and the vertical transform use the same transform kernel.

FIGS. 17 and 18 are diagrams illustrating an embodiment in which transform skip information is signaled after signaling information indicating whether to use multiple transforms.

FIG. 19 is a diagram illustrating an embodiment in which information indicating whether to use multiple transforms is signaled after signaling transform skip information.

FIG. 20 is a diagram illustrating an embodiment in which signaling of multiple transform usage information is determined on the basis of horizontal transform skip information and vertical transform skip information.

MODE FOR INVENTION

Figure 1:
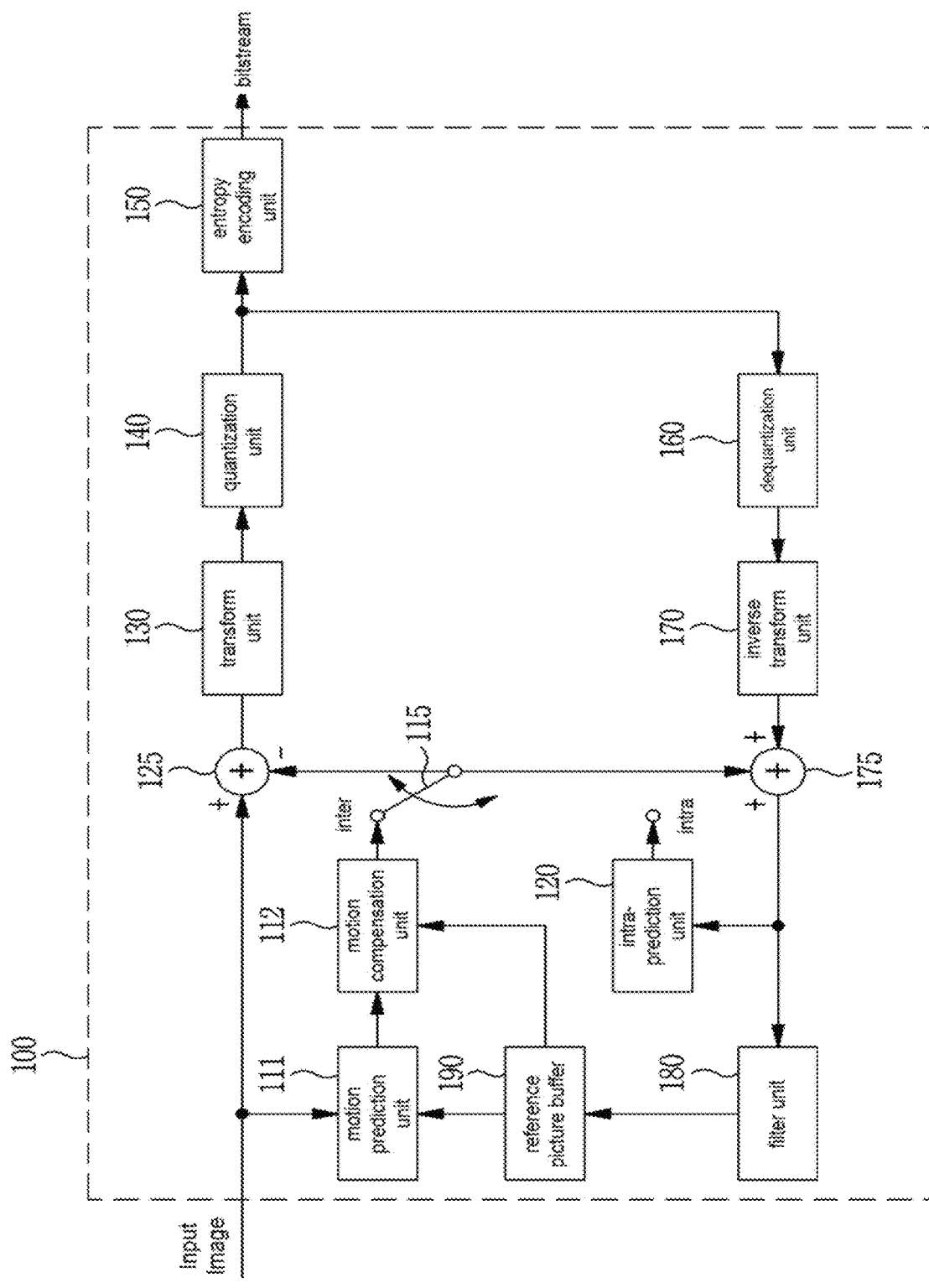
FIG. 1 is a block diagram illustrating a configuration of an encoding apparatus according to an embodiment of the present invention

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. Various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be skipped.

Hereinafter, an image may mean a picture configuring a video, or may mean the video itself. For example, "encoding or decoding or both of an image" may mean "encoding or decoding or both of a moving picture" and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means a decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to 2Bd−1 according to a bit depth (Bd). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

When the size of the coding block is within a predetermined range, the division is possible using only quad-tree partitioning. Here, the predetermined range may be defined as at least one of a maximum size and a minimum size of a coding block in which the division is possible using only quad-tree partitioning. Information indicating a maximum/minimum size of a coding block in which quad-tree partitioning is allowed may be signaled through a bitstream, and the information may be signaled in at least one unit of a sequence, a picture parameter, a tile group, or a slice (segment). Alternatively, the maximum/minimum size of the coding block may be a fixed size predetermined in the coder/decoder. For example, when the size of the coding block corresponds to 256×256 to 64×64, the division is possible only using quad-tree partitioning. Alternatively, when the size of the coding block is larger than the size of the maximum conversion block, the division is possible only using quad-tree partitioning. Herein, the block to be divided may be at least one of coding blocks and a transform block. In this case, information indicating the division of the coded block (for example, split_flag) may be a flag indicating whether or not to perform the quad-tree partitioning. When the size of the coding block falls within a predetermined range, the division is possible only using binary tree or ternary tree partitioning. In this case, the above description of the quad-tree partitioning may be applied to binary tree partitioning or ternary tree partitioning in the same manner.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node(Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, a tile group header, and tile header information. The term "tile group" means a group of tiles and has the same meaning as a slice.

An adaptation parameter set may mean a parameter set that can be shared by being referred to in different pictures, subpictures, slices, tile groups, tiles, or bricks. In addition, information in an adaptation parameter set may be used by referring to different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a subpicture, a slice, a tile group, a tile, or a brick inside a picture.

In addition, regarding the adaptation parameter set, different adaptation parameter sets may be referred to by using identifiers of different adaptation parameter sets for a slice, a tile group, a tile, or a brick inside a subpicture.

In addition, regarding the adaptation parameter set, different adaptation parameter sets may be referred to by using identifiers of different adaptation parameter sets for a tile or a brick inside a slice.

In addition, regarding the adaptation parameter set, different adaptation parameter sets may be referred to by using identifiers of different adaptation parameter sets for a brick inside a tile.

Information on an adaptation parameter set identifier may be included in a parameter set or a header of the subpicture, and an adaptation parameter set corresponding to the adaptation parameter set identifier may be used for the subpicture.

The information on the adaptation parameter set identifier may be included in a parameter set or a header of the tile, and an adaptation parameter set corresponding to the adaptation parameter set identifier may be used for the tile.

The information on the adaptation parameter set identifier may be included in a header of the brick, and an adaptation parameter set corresponding to the adaptation parameter set identifier may be used for the brick.

The picture may be partitioned into one or more tile rows and one or more tile columns.

The subpicture may be partitioned into one or more tile rows and one or more tile columns within a picture. The subpicture may be a region having the form of a rectangle/square within a picture and may include one or more CTUs. In addition, at least one or more tiles/bricks/slices may be included within one subpicture.

The tile may be a region having the form of a rectangle/square within a picture and may include one or more CTUs. In addition, the tile may be partitioned into one or more bricks.

The brick may mean one or more CTU rows within a tile. The tile may be partitioned into one or more bricks, and each brick may have at least one or more CTU rows. A tile that is not partitioned into two or more may mean a brick.

The slice may include one or more tiles within a picture and may include one or more bricks within a tile.

Parsing: may mean determination of a value of a syntax element by performing entropy decoding or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference picture list: may refer to a list including one or more reference pictures used for inter prediction or motion compensation. There are several types of usable reference picture lists, including LC (List combined), L0 (List 0), L1 (List 1), L2 (List 2), L3 (List 3).

Inter prediction indicator: may refer to a direction of inter prediction (unidirectional prediction, bidirectional prediction, etc.) of a current block. Alternatively, it may refer to the number of reference pictures used to generate a prediction block of a current block. Alternatively, it may refer to the number of prediction blocks used at the time of performing inter prediction or motion compensation on a current block.

Prediction list utilization flag: indicates whether a prediction block is generated using at least one reference picture in a specific reference picture list. An inter prediction indicator can be derived using a prediction list utilization flag, and conversely, a prediction list utilization flag can be derived using an inter prediction indicator. For example, when the prediction list utilization flag has a first value of zero (0), it means that a reference picture in a reference picture list is not used to generate a prediction block. On the other hand, when the prediction list utilization flag has a second value of one (1), it means that a reference picture list is used to generate a prediction block.

Reference picture index: may refer to an index indicating a specific reference picture in a reference picture list.

Reference picture: may mean a reference picture which is referred to by a specific block for the purposes of inter prediction or motion compensation of the specific block. Alternatively, the reference picture may be a picture including a reference block referred to by a current block for inter prediction or motion compensation. Hereinafter, the terms "reference picture" and "reference image" have the same meaning and can be interchangeably.

Motion vector: may be a two-dimensional vector used for inter prediction or motion compensation. The motion vector may mean an offset between an encoding/decoding target block and a reference block. For example, (mvX, mvY) may represent a motion vector. Here, mvX may represent a horizontal component and mvY may represent a vertical component.

Search range: may be a two-dimensional region which is searched to retrieve a motion vector during inter prediction. For example, the size of the search range may be M×N. Here, M and N are both integers.

Motion vector candidate: may refer to a prediction candidate block or a motion vector of the prediction candidate block when predicting a motion vector. In addition, a motion vector candidate may be included in a motion vector candidate list.

Motion vector candidate list: may mean a list composed of one or more motion vector candidates.

Motion vector candidate index: may mean an indicator indicating a motion vector candidate in a motion vector candidate list. Alternatively, it may be an index of a motion vector predictor.

Motion information: may mean information including at least one of the items including a motion vector, a reference picture index, an inter prediction indicator, a prediction list utilization flag, reference picture list information, a reference picture, a motion vector candidate, a motion vector candidate index, a merge candidate, and a merge index.

Merge candidate list: may mean a list composed of one or more merge candidates.

Merge candidate: may mean a spatial merge candidate, a temporal merge candidate, a combined merge candidate, a combined bi-predictive merge candidate, or a zero-merge candidate. The merge candidate may include motion information such as an inter prediction indicator, a reference picture index for each list, a motion vector, a prediction list utilization flag, and an inter prediction indicator.

Merge index: may mean an indicator indicating a merge candidate in a merge candidate list. Alternatively, the merge index may indicate a block from which a merge candidate has been derived, among reconstructed blocks spatially/temporally adjacent to a current block. Alternatively, the merge index may indicate at least one motion information of a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a sum value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a difference of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level(quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode(intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary(first) transform is used, information of whether or not a secondary transform is used, a primary transform index, a secondary transform index, information of whether or not a residual signal is present, a coded block pattern, a coded block flag(CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, tile group identification information, a tile group type, tile group partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
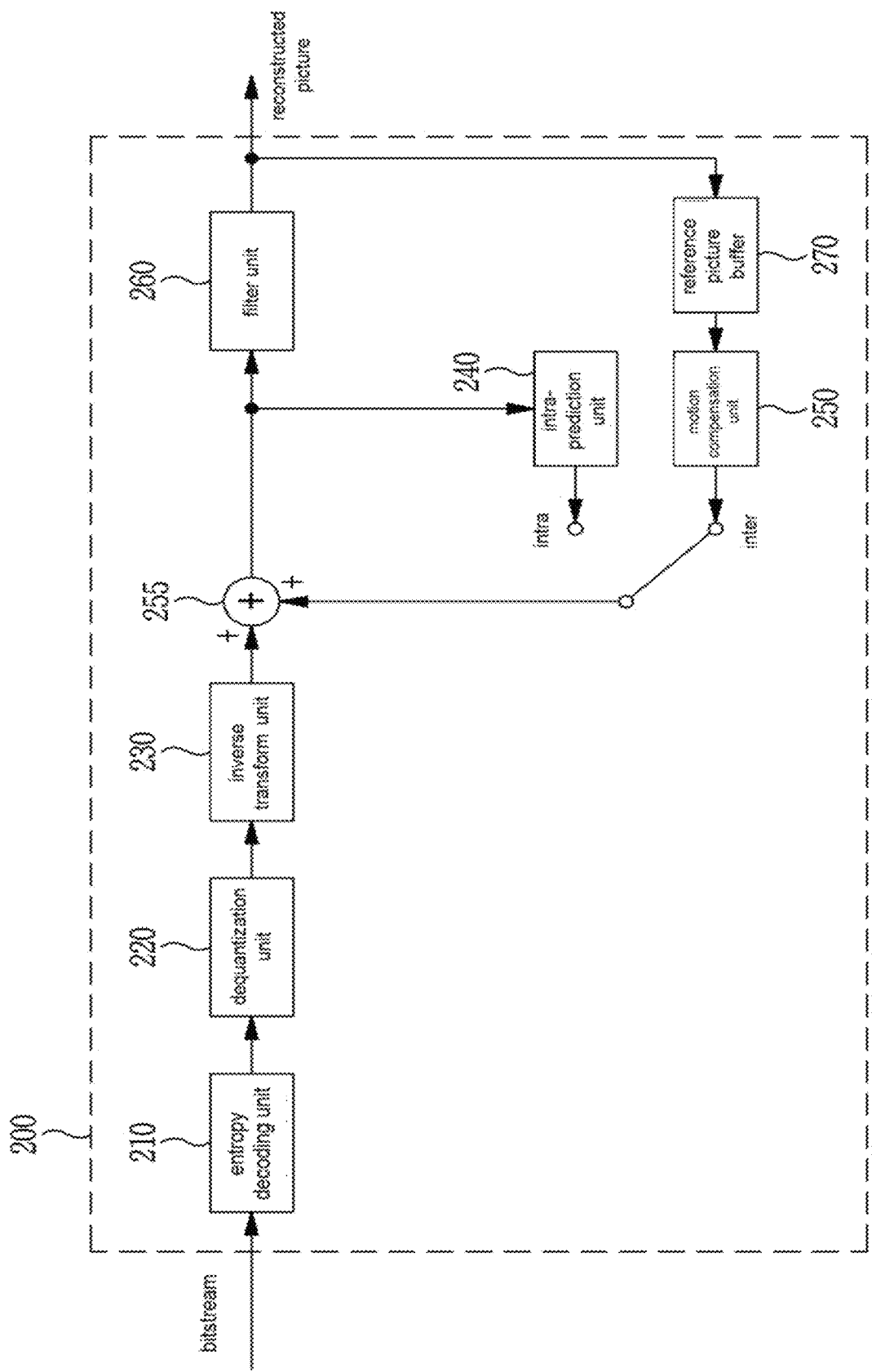
FIG. 2 is a block diagram illustrating a configuration of a decoding apparatus according to an embodiment of the present invention.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level(quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 255 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
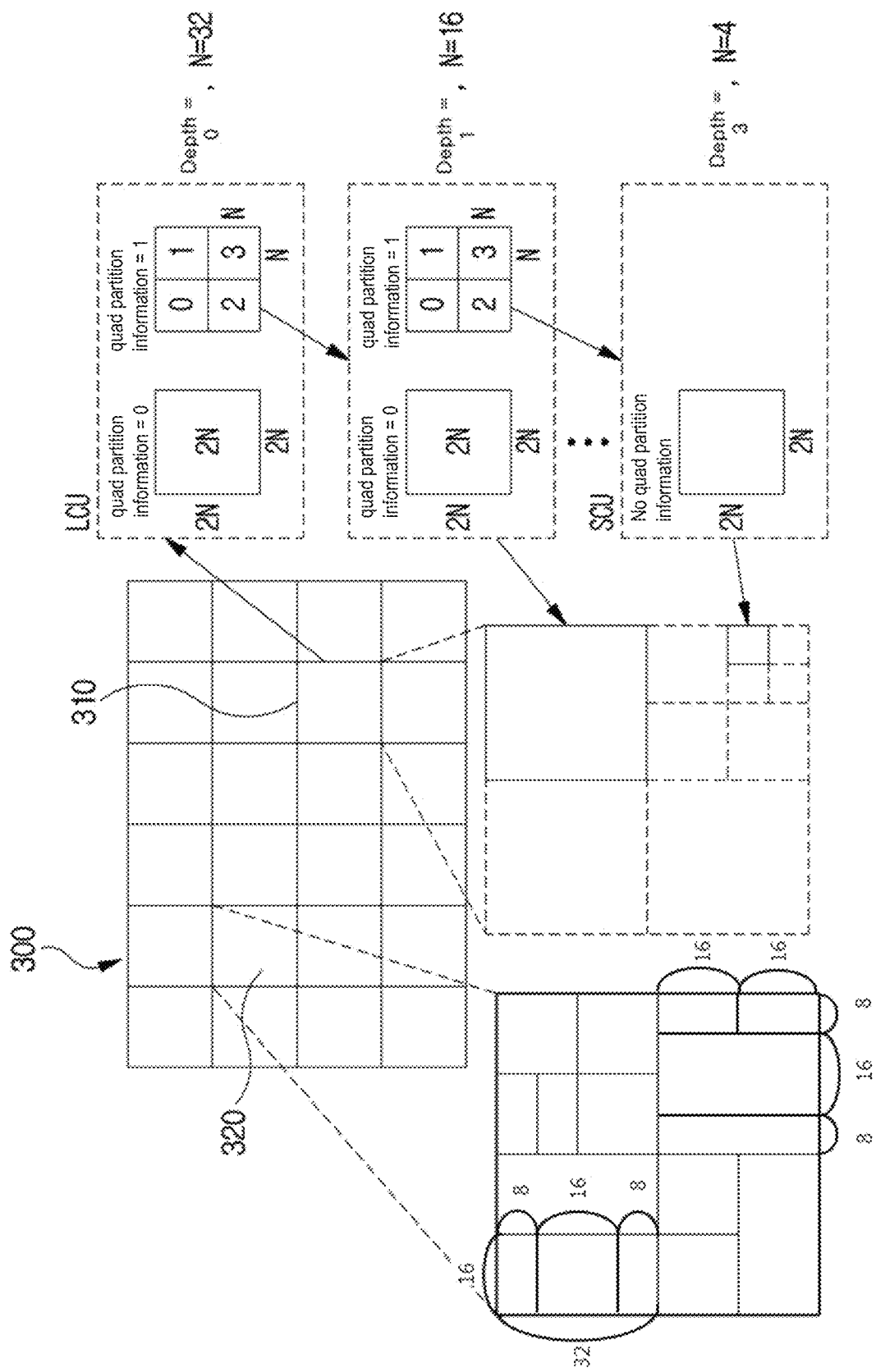
FIG. 3 is a diagram schematically illustrating a division structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is a first value, the CU may not be partitioned, when a value of partition information is a second value, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, a tile group level, a tile level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, a tile group level, a tile level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, a tile group level, a tile level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and 23 vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, the binary tree partitioning or the ternary tree partitioning may be limited on the basis of the size of a virtual pipeline data unit (hereinafter, a pipeline buffer size). For example, when the coding unit is divided into sub-coding units which do not fit the pipeline buffer size by the binary tree partitioning or the ternary tree partitioning, the corresponding binary tree partitioning or ternary tree partitioning may be limited. The pipeline buffer size may be the size of the maximum transform block (e.g., 64×64). For example, when the pipeline buffer size is 64×64, the division below may be limited.

N×M (N and/or M is 128) Ternary tree partitioning for coding units

128×N (N<=64) Binary tree partitioning in horizontal direction for coding units

N×128 (N<=64) Binary tree partitioning in vertical direction for coding units

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
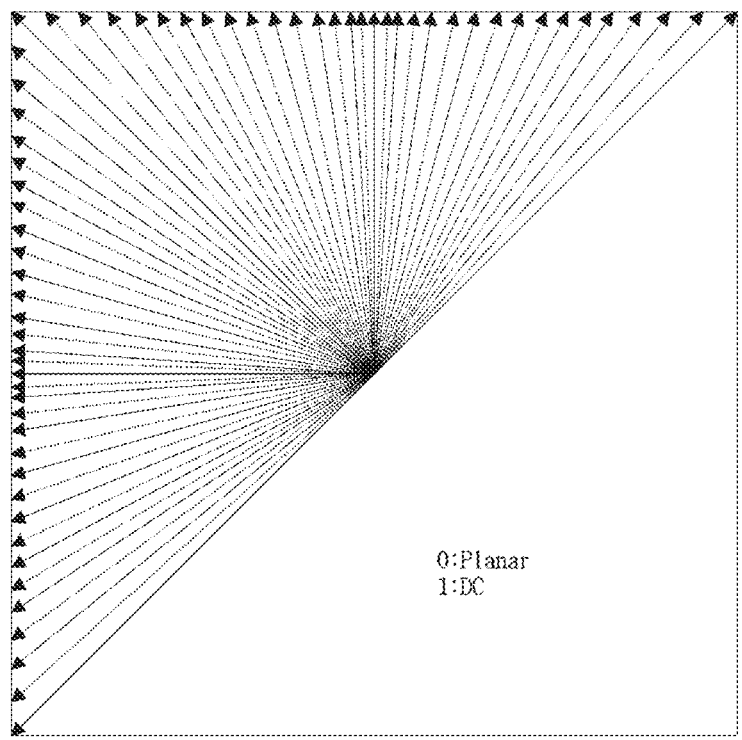
FIG. 4 is a diagram illustrating an embodiment of an intra prediction process.

FIG. 4 is a view showing an intra-prediction process.

Arrows from center to outside in FIG. 4 may represent prediction directions of intra prediction modes.

Intra encoding and/or decoding may be performed by using a reference sample of a neighbor block of the current block. A neighbor block may be a reconstructed neighbor block. For example, intra encoding and/or decoding may be performed by using an encoding parameter or a value of a reference sample included in a reconstructed neighbor block.

A prediction block may mean a block generated by performing intra prediction. A prediction block may correspond to at least one among CU, PU and TU. A unit of a prediction block may have a size of one among CU, PU and TU. A prediction block may be a square block having a size of 2×2, 4×4, 16×16, 32×32 or 64×64 etc. or may be a rectangular block having a size of 2×8, 4×8, 2×16, 4×16 and 8×16 etc.

Intra prediction may be performed according to intra prediction mode for the current block. The number of intra prediction modes which the current block may have may be a fixed value and may be a value determined differently according to an attribute of a prediction block. For example, an attribute of a prediction block may comprise a size of a prediction block and a shape of a prediction block, etc.

The number of intra-prediction modes may be fixed to N regardless of a block size. Or, the number of intra prediction modes may be 3, 5, 9, 17, 34, 35, 36, 65, or 67 etc. Alternatively, the number of intra-prediction modes may vary according to a block size or a color component type or both. For example, the number of intra prediction modes may vary according to whether the color component is a luma signal or a chroma signal. For example, as a block size becomes large, a number of intra-prediction modes may increase. Alternatively, a number of intra-prediction modes of a luma component block may be larger than a number of intra-prediction modes of a chroma component block.

An intra-prediction mode may be a non-angular mode or an angular mode. The non-angular mode may be a DC mode or a planar mode, and the angular mode may be a prediction mode having a specific direction or angle. The intra-prediction mode may be expressed by at least one of a mode number, a mode value, a mode numeral, a mode angle, and mode direction. A number of intra-prediction modes may be M, which is larger than 1, including the non-angular and the angular mode. In order to intra-predict a current block, a step of determining whether or not samples included in a reconstructed neighbor block may be used as reference samples of the current block may be performed. When a sample that is not usable as a reference sample of the current block is present, a value obtained by duplicating or performing interpolation on at least one sample value among samples included in the reconstructed neighbor block or both may be used to replace with a non-usable sample value of a sample, thus the replaced sample value is used as a reference sample of the current block.

Figure 7:
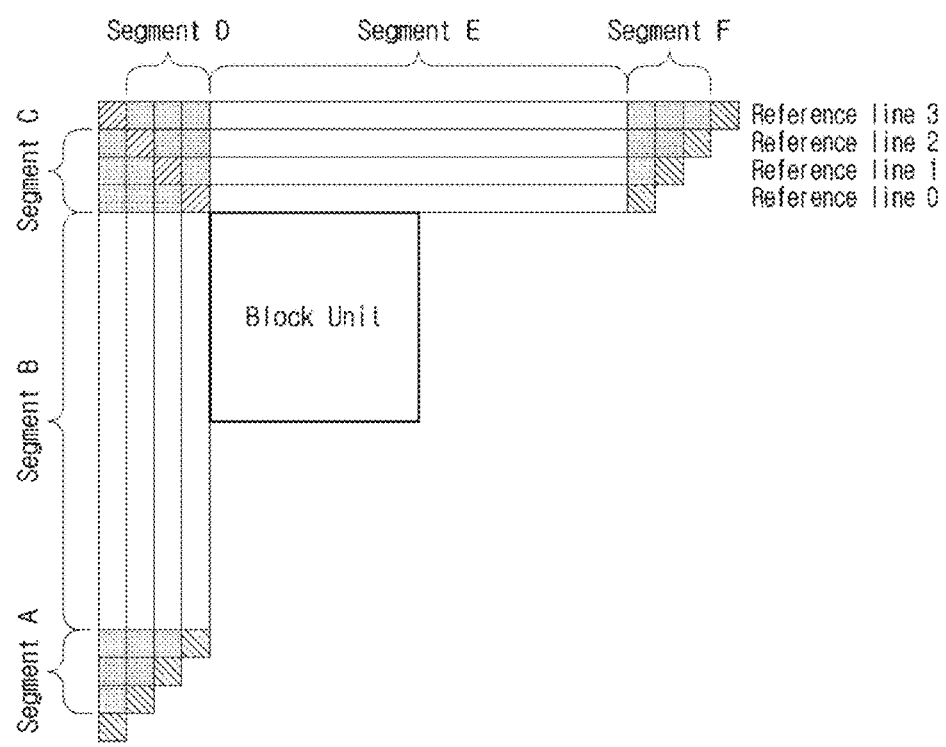
FIG. 7 is a diagram illustrating reference samples available for intra prediction.

FIG. 7 is a diagram illustrating reference samples capable of being used for intra prediction.

As shown in FIG. 7, at least one of the reference sample line 0 to the reference sample line 3 may be used for intra prediction of the current block. In FIG. 7, the samples of a segment A and a segment F may be padded with the samples closest to a segment B and a segment E, respectively, instead of retrieving from the reconstructed neighboring block. Index information indicating the reference sample line to be used for intra prediction of the current block may be signaled. When the upper boundary of the current block is the boundary of the CTU, only the reference sample line 0 may be available. Therefore, in this case, the index information may not be signaled. When a reference sample line other than the reference sample line 0 is used, filtering for a prediction block, which will be described later, may not be performed.

When intra-predicting, a filter may be applied to at least one of a reference sample and a prediction sample based on an intra-prediction mode and a current block size.

In case of a planar mode, when generating a prediction block of a current block, according to a position of a prediction target sample within a prediction block, a sample value of the prediction target sample may be generated by using a weighted sum of an upper and left side reference sample of a current sample, and a right upper side and left lower side reference sample of the current block. In addition, in case of a DC mode, when generating a prediction block of a current block, an average value of upper side and left side reference samples of the current block may be used. In addition, in case of an angular mode, a prediction block may be generated by using an upper side, a left side, a right upper side, and/or a left lower side reference sample of the current block. In order to generate a prediction sample value, interpolation of a real number unit may be performed.

In the case of intra prediction between color components, a prediction block for the current block of the second color component may be generated on the basis of the corresponding reconstructed block of the first color component. For example, the first color component may be a luma component, and the second color component may be a chroma component. For intra prediction between color components, the parameters of the linear model between the first color component and the second color component may be derived on the basis of the template. The template may 23 include upper and/or left neighboring samples of the current block and upper and/or left neighboring samples of the reconstructed block of the first color component corresponding thereto. For example, the parameters of the linear model may be derived using a sample value of a first color component having a maximum value among samples in a template and a sample value of a second color component corresponding thereto, and a sample value of a first color component having a minimum value among samples in the template and a sample value of a second color component corresponding thereto. When the parameters of the linear model are derived, a corresponding reconstructed block may be applied to the linear model to generate a prediction block for the current block. According to a video format, subsampling may be performed on the neighboring samples of the reconstructed block of the first color component and the corresponding reconstructed block. For example, when one sample of the second color component corresponds to four samples of the first color component, four samples of the first color component may be sub-sampled to compute one corresponding sample. In this case, the parameter derivation of the linear model and intra prediction between color components may be performed on the basis of the corresponding sub-sampled samples. Whether or not to perform intra prediction between color components and/or the range of the template may be signaled as the intra prediction mode.

The current block may be partitioned into two or four sub-blocks in the horizontal or vertical direction. The partitioned sub-blocks may be sequentially reconstructed. That is, the intra prediction may be performed on the sub-block to generate the sub-prediction block. In addition, dequantization and/or inverse transform may be performed on the sub-blocks to generate sub-residual blocks. A reconstructed sub-block may be generated by adding the sub-prediction block to the sub-residual block. The reconstructed sub-block may be used as a reference sample for intra prediction of the sub-blocks. The sub-block may be a block including a predetermined number (for example, 16) or more samples. Accordingly, for example, when the current block is an 8×4 block or a 4×8 block, the current block may be partitioned into two sub-blocks. Also, when the current block is a 4×4 block, the current block may not be partitioned into sub-blocks. When the current block has other sizes, the current block may be partitioned into four sub-blocks. Information on whether or not to perform the intra prediction based on the sub-blocks and/or the partitioning direction (horizontal or vertical) may be signaled. The intra prediction based on the sub-blocks may be limited to be performed only when reference sample line 0 is used. When the intra prediction based on the sub-block is performed, filtering for the prediction block, which will be described later, may not be performed.

The final prediction block may be generated by performing filtering on the prediction block that is intra-predicted. The filtering may be performed by applying predetermined weights to the filtering target sample, the left reference sample, the upper reference sample, and/or the upper left reference sample. The weight and/or the reference sample (range, position, etc.) used for the filtering may be determined on the basis of at least one of a block size, an intra prediction mode, and a position of the filtering target sample in the prediction block. The filtering may be performed only in the case of a predetermined intra prediction mode (e.g., DC, planar, vertical, horizontal, diagonal, and/or adjacent diagonal modes). The adjacent diagonal mode may be a mode in which k is added to or subtracted from the diagonal mode. For example, k may be a positive integer of 8 or less.

An intra-prediction mode of a current block may be entropy encoded/decoded by predicting an intra-prediction mode of a block present adjacent to the current block. When intra-prediction modes of the current block and the neighbor block are identical, information that the intra-prediction modes of the current block and the neighbor block are identical may be signaled by using predetermined flag information. In addition, indicator information of an intra-prediction mode that is identical to the intra-prediction mode of the current block among intra-prediction modes of a plurality of neighbor blocks may be signaled. When intra-prediction modes of the current block and the neighbor block are different, intra-prediction mode information of the current block may be entropy encoded/decoded by performing entropy encoding/decoding based on the intra-prediction mode of the neighbor block.

Figure 5:
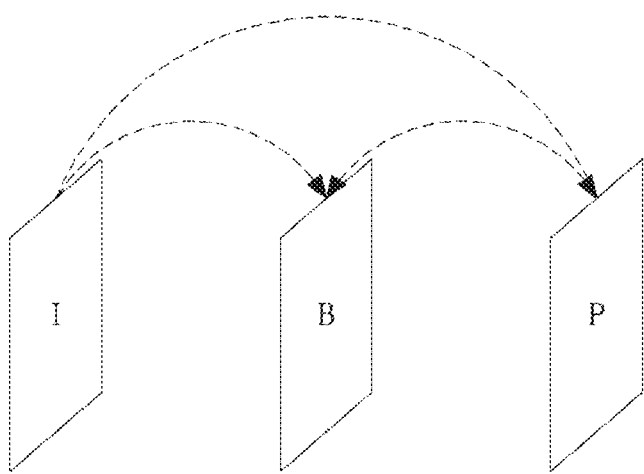
FIG. 5 is a diagram illustrating an embodiment of an inter prediction process.

FIG. 5 is a diagram illustrating an embodiment of an inter-picture prediction process.

In FIG. 5, a rectangle may represent a picture. In FIG. 5, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Hereinbelow, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

The derivation method of the motion information may be different depending on the prediction mode of the current block. For example, a prediction mode applied for inter prediction includes an AMVP mode, a merge mode, a skip mode, a merge mode with a motion vector difference, a subblock merge mode, a triangle partition mode, an inter-intra combination prediction mode, affine mode, and the like. Herein, the merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

Meanwhile, the coding apparatus 100 may perform entropy-coding on resolution information of the calculated MVD. The decoding apparatus 200 may adjust the resolution of the entropy-decoded MVD using the MVD resolution information.

Meanwhile, the coding apparatus 100 calculates a motion vector difference (MVD) between a motion vector and a motion vector candidate in the current block on the basis of an affine model, and performs entropy-coding on the MVD. The decoding apparatus 200 derives a motion vector on a per sub-block basis by deriving an affine control motion vector of a decoding target block through the sum of the entropy-decoded MVD and an affine control motion vector candidate.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least one of motion information (spatial merge candidate) of a neighboring block adjacent to the current block, motion information (temporal merge candidate) of the collocated block of the current block in the reference picture, new motion information generated by a combination of the motion information exiting in the merge candidate list, motion information (history-based merge candidate) of the block that is encoded/decoded before the current block, and zero merge candidate.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

Meanwhile, the coding apparatus 100 performs entropy-coding on the correction information for correcting the motion vector among the motion information of the merge candidate and signals the same to the decoding apparatus 200. The decoding apparatus 200 can correct the motion vector of the merge candidate selected by the merge index on the basis of the correction information. Here, the correction information may include at least one of information on whether or not to perform the correction, correction direction information, and correction size information. As described above, the prediction mode that corrects the motion vector of the merge candidate on the basis of the signaled correction information may be referred to as a merge mode having the motion vector difference.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The subblock merge mode may mean a mode that derives the motion information in units of sub-blocks of a coding block (CU). When the subblock merge mode is applied, a subblock merge candidate list may be generated using motion information (sub-block based temporal merge candidate) of the sub-block collocated to the current sub-block in the reference image and/or an affine control point motion vector merge candidate.

The triangle partition mode may mean a mode that derives motion information by partitioning the current block into diagonal directions, derives each prediction sample using each of the derived motion information, and derives the prediction sample of the current block by weighting each of the derived prediction samples.

The inter-intra combined prediction mode may mean a mode that derives a prediction sample of the current block by weighting a prediction sample generated by inter prediction and a prediction sample generated by intra prediction.

The decoding apparatus 200 may correct the derived motion information by itself. The decoding apparatus 200 may search the predetermined region on the basis of the reference block indicated by the derived motion information and derive the motion information having the minimum SAD as the corrected motion information.

The decoding apparatus 200 may compensate a prediction sample derived via inter prediction using an optical flow.

Figure 6:
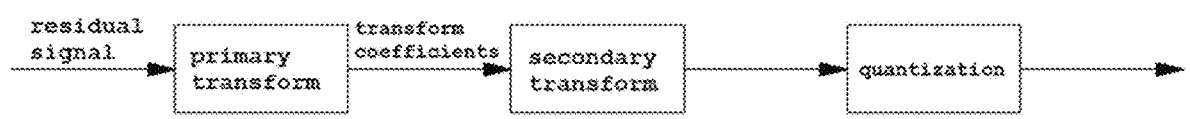
FIG. 6 is a diagram illustrating a process of transform and quantization.

FIG. 6 is a diagram illustrating a transform and quantization process.

As illustrated in FIG. 6, a transform and/or quantization process is performed on a residual signal to generate a quantized level signal. The residual signal is a difference between an original block and a prediction block (i.e., an intra prediction block or an inter prediction block). The prediction block is a block generated through intra prediction or inter prediction. The transform may be a primary transform, a secondary transform, or both. The primary transform of the residual signal results in transform coefficients, and the secondary transform of the transform coefficients results in secondary transform coefficients.

At least one scheme selected from among various transform schemes which are preliminarily defined is used to perform the primary transform. For example, examples of the predefined transform schemes include discrete cosine transform (DCT), discrete sine transform (DST), and Karhunen-Loéve transform (KLT). The transform coefficients generated through the primary transform may undergo the secondary transform. The transform schemes used for the primary transform and/or the secondary transform may be determined according to coding parameters of the current block and/or neighboring blocks of the current block. Alternatively, transform information indicating the transform scheme may be signaled. The DCT-based transform may include, for example, DCT-2, DCT-8, and the like. The DST-based transform may include, for example, DST-7.

A quantized-level signal (quantization coefficients) may be generated by performing quantization on the residual signal or a result of performing the primary transform and/or the secondary transform. The quantized level signal may be scanned according to at least one of a diagonal up-right scan, a vertical scan, and a horizontal scan, depending on an intra prediction mode of a block or a block size/shape. For example, as the coefficients are scanned in a diagonal up-right scan, the coefficients in a block form change into a one-dimensional vector form. Aside from the diagonal up-right scan, the horizontal scan of horizontally scanning a two-dimensional block form of coefficients or the vertical scan of vertically scanning a two-dimensional block form of coefficients may be used depending on the intra prediction mode and/or the size of a transform block. The scanned quantized-level coefficients may be entropy-encoded to be inserted into a bitstream.

A decoder entropy-decodes the bitstream to obtain the quantized-level coefficients. The quantized-level coefficients may be arranged in a two-dimensional block form through inverse scanning. For the inverse scanning, at least one of a diagonal up-right scan, a vertical scan, and a horizontal scan may be used.

The quantized-level coefficients may then be dequantized, then be secondary-inverse-transformed as necessary, and finally be primary-inverse-transformed as necessary to generate a reconstructed residual signal.

Inverse mapping in a dynamic range may be performed for a luma component reconstructed through intra prediction or inter prediction before in-loop filtering. The dynamic range may be divided into 16 equal pieces and the mapping function for each piece may be signaled. The mapping function may be signaled at a slice level or a tile group level. An inverse mapping function for performing the inverse mapping may be derived on the basis of the mapping function. In-loop filtering, reference picture storage, and motion compensation are performed in an inverse mapped region, and a prediction block generated through inter prediction is converted into a mapped region via mapping using the mapping function, and then used for generating the reconstructed block. However, since the intra prediction is performed in the mapped region, the prediction block generated via the intra prediction may be used for generating the reconstructed block without mapping/inverse mapping.

When the current block is a residual block of a chroma component, the residual block may be converted into an inverse mapped region by performing scaling on the chroma component of the mapped region. The availability of the scaling may be signaled at the slice level or the tile group level. The scaling may be applied only when the mapping for the luma component is available and the division of the luma component and the division of the chroma component follow the same tree structure. The scaling may be performed on the basis of an average of sample values of a luma prediction block corresponding to the color difference block. In this case, when the current block uses inter prediction, the luma prediction block may mean a mapped luma prediction block. A value necessary for the scaling may be derived by referring to a lookup table using an index of a piece to which an average of sample values of a luma prediction block belongs. Finally, by scaling the residual block using the derived value, the residual block may be switched to the inverse mapped region. Then, chroma component block restoration, intra prediction, inter prediction, in-loop filtering, and reference picture storage may be performed in the inverse mapped area.

Information indicating whether the mapping/inverse mapping of the luma component and chroma component is available may be signaled through a set of sequence parameters.

The prediction block of the current block may be generated on the basis of a block vector indicating a displacement between the current block and the reference block in the current picture. In this way, a prediction mode for generating a prediction block with reference to the current picture is referred to as an intra block copy (IBC) mode. The IBC mode may be applied to M×N (M<=64, N<=64) coding units. The IBC mode may include a skip mode, a merge mode, an AMVP mode, and the like. In the case of a skip mode or a merge mode, a merge candidate list is constructed, and the merge index is signaled so that one merge candidate may be specified. The block vector of the specified merge candidate may be used as a block vector of the current block. The merge candidate list may include at least one of a spatial candidate, a history-based candidate, a candidate based on an average of two candidates, and a zero-merge candidate. In the case of an AMVP mode, the difference block vector may be signaled. In addition, the prediction block vector may be derived from the left neighboring block and the upper neighboring block of the current block. The index on which neighboring block to use may be signaled. The prediction block in the IBC mode is included in the current CTU or the left CTU and limited to a block in the already reconstructed area. For example, a value of the block vector may be limited such that the prediction block of the current block is positioned in an area of three 64×64 blocks preceding the 64×64 block to which the current block belongs in the coding/decoding order. By limiting the value of the block vector in this way, memory consumption and device complexity according to the IBC mode implementation may be reduced.

Hereinafter, an image decoding/encoding method will be described according to an embodiment of the present invention.

There are a variety of encoding techniques that may be used to encode an image. In addition, a particular technique may be advantageous over other techniques depending on the nature of the image to be encoded.

Thus, the encoder may adaptively determine whether or not to use a plurality of various encoding techniques for the corresponding block, thereby performing the most advantageous encoding. Among various selectable techniques, in order to select the most advantageous coding technique for the corresponding block, the encoder may generally perform rate-distortion optimization (RDO).

Since the encoder cannot know in advance which of the various encoding decisions that may be selected for encoding an image is the best at a particular side (e.g., rate-distortion side), the encoder performs encoding (or simplified encoding) on each of the possible combinations of encoding decisions to calculate rate-distortion values for the combinations, and then determines an encoding decision having the smallest rate-distortion value among the rate-distortion calculations as a final encoding decision for the block.

In addition, the encoder records the encoding decision in a bitstream, so that the decoder may read (parse) the same and perform an exact reverse process corresponding to the encoding, to make it possible to perform decoding. Here, information about the encoding decision may be referred to as encoding decision information.

Since each channel such as YCbCr, RGB, XYZ, etc. of the image does not always have the same property between the channels, making independent encoding decisions for each channel is more effective in terms of improving compression ratio.

In addition, since channels often have different block structures from each other (where blocks include both square or rectangular shapes), an effective transform method may be determined through a process such as RDO among transforms (called "multiple transform") having various sizes or various kernel functions. In addition, whether the transform is performed on a block to be encoded simultaneously with multiple transform selection may be determined. That is, it is determined whether the transform is performed for each transform block, and transform skip information may be recorded in the bitstream for each color channel (or as specific channel information).

In the case where a variation of the spatial pixel value in the corresponding image block to be compressed is very large, or in particular, the variation is locally limited, the degree of image energy concentration at low frequency is not large and the transform coefficient of the high frequency region having a relatively large value may occur even when the transform is applied. Therefore, when applying the transform and quantization technique that mainly maintains the low frequency signal components through the quantization process after the transform and removes the high frequency signal components or reduces the amount of data by applying quantization strongly, serious image quality degradation may occur. In particular, this problem is large when the variation in the image value is concentrated at a place where the variation in the spatial pixel value is large or locally limited.

In order to solve this problem, instead of performing uniform transform on the image block, a method of performing direct encoding of pixel values in the spatial domain without transform may be used.

According to this technique, it is determined whether the transform is skipped for each transform block, and encoding may be performed by performing or skipping transform according to the determination. The problem may be solved by inserting information indicating transform skip into the bit stream to instruct the decoder whether to perform transform on the corresponding block. Herein, the information indicating whether to perform the transform may be referred to as transform skip information.

The transform skip information may be transmitted for each of a luminance (luma or Y channel) signal and a chrominance (chroma or Cb channel/Cr channel) signal, that is, channels Y, Cb, and Cr. The decoder may perform or skip transform for the corresponding block according to the value of transform skip information for each channel parsed from the bitstream.

However, the existing technology has always had a problem of determining whether perform or skip transform for each transform block. That is, since it is determined whether to skip/perform transform simultaneously for both the horizontal and vertical directions of the transform block, there is a problem that it is difficult to select an efficient transform method. That is, it is impossible to perform or skip transform independently for each of the horizontal and longitudinal directions of the transform block. In addition, since the luma channel undergoes multiple transform selection, the overhead required to find the optimal transform method is larger. In addition, such a reduced compression ratio inevitably causes a problem that degrades the quality of the compressed image.

Meanwhile, the present invention may apply a horizontal transform and a vertical transform to both luma and chroma channels in a transform process when performing image encoding, by applying a variety of techniques, such as transform encoding using predictive encoding and transform to a high resolution image such as 4K or 8K.

In addition, the order of reading (parsing) the transform skip information and the multiple transform information may be effectively determined, thereby providing more efficient compression.

According to the present invention, transform skip and multiple transform selection may be performed even when the luma channel and the chroma channel have the same block partition structure to each other or when the luma channel and the chroma channel has the block partition structures different from each other.

By using the technique of the present invention, it is possible to resolve a problem that the reduction of compression ratio and the image quality occurs when the existing technique is applied.

In general, when transform technique is applied to an image in which the degree of change in pixel values is spatially concentrated, energy is not concentrated toward low frequencies, but a large number of high frequency components are generated due to a higher change in pixel values, whereby it is sometimes disadvantageous to perform transform encoding in terms of compression ratio. In this case, when the transform is performed, a problem of serious deterioration may occur.

Therefore, the present invention selectively applies transform or transform skip to each of the horizontal and vertical directions, whereby there is an effect of increasing the compression ratio while obtaining good image quality.

Meanwhile, as the resolution of the image increases, it is sometimes advantageous in terms of compression ratio to use a larger transform block size during the transform. In addition, the combination of a type of transform and the horizontal and vertical sizes of the transform block may be used in various ways. In addition, each color channel of the image may not have the same block structure, or may not have the same transform.

The transform used for image compression may require a 2D transform when the transform block is a 2D signal. Meanwhile, since applying the 2D transform is not advantageous in terms of calculation amount, a separable transform may be used in general. The separable transform is such that each row data of a two-dimensional transform block is one-dimensionally transformed in one direction (for example, horizontal direction), and each column data is one-dimensionally transformed in another direction (for example, vertical direction) for data thus obtained, thereby performing two-dimensional transform. This is possible because the kernel function of transform is separable. Since such a separable transform is used, it is possible to reduce computation complexity by performing a simpler one-dimensional transform twice, without a need for a large amount of computation when performing a two-dimensional transform.

As the size of the transform block is larger, the transform gain is increased, and when the size of the transform block is small, a case may occur in which there is not a big difference in terms of compression efficiency regardless of whether the transform is performed or not.

In this respect, it is advantageous to set the size of the transform block as large as possible to obtain higher transform gain. However, when there are many pixels with a variance of discontinuous values in one transform block (for example, when sharp edges are included), it is more advantageous in terms of compression efficiency that block is divided into two or more transform blocks to allow each block to be independently transformed so that the discontinuity is not included, rather than setting the transform block to be large as one block. For this reason, in the encoder, it is important to set the size of the transform block appropriately so that the size of the transform block is set to be as large as possible and the discontinuity causing a reduction in compression efficiency is not included, in order to obtain the best compression ratio.

In consideration of the above, it is possible to use a technique of performing the transform by determining a transform block size so that the corresponding block is an N×N block having an appropriate value when an N×N DCT (N=4, 8, and 16) is provided. In addition, as shown in 8×8 DCT in MPEG-1 and MPEG-2, 4×4 DCT in H.264/AVC, N×N DCT in HEVC (N=4, 8, 16), and the like, the transform block used in image compression up to now has been a square. That is, the horizontal and vertical sizes of the transform block were the same.

However, the transform block does not necessarily have to be a square. That is, the horizontal and vertical sizes may be different from each other. Therefore, when a transform block having an appropriate size is determined for a given image, the image may be divided into square transform blocks having the same horizontal and vertical size. However, in some cases, the image may be divided into transform blocks having rectangles having horizontal and vertical sizes different from each other.

Meanwhile, when a large number of discontinuities are included in the image, it may be advantageous in this aspect to set the size of the transform block as small as possible so that many discontinuities are not included in the same block. However, when the transform block is set small, sometimes a case occurs in which the transform gain may be small and the signaling overhead for indicating the transform block may be larger than the transform gain. Therefore, in this case, it may be advantageous to perform encoding in pixel space without performing the transform. In consideration of this aspect, the above-described transform skip technique may be used. The transform skip may mean that when it is disadvantageous to perform the transform on the transform block, information (i.e., transform skip information) indicating that the transform is not performed on the corresponding block is signaled so that encoding is performed in pixel space without performing the transform. Here, the transform skip information may be expressed in a flag format and may be referred to as a transform skip flag.

When the decoder decodes the transform block, the decoder first reads a transform skip flag for the block; when a value of the transform skip flag is 1, performs image decoding without performing inverse transform; and when the value of the transform skip flag is 0, performs image decoding by performing inverse transform. Here, the roles of 0 and 1 may be set in reverse.

In technologies up to now, whether to skip or perform the transform has been determined for each two-dimensional transform block during image encoding. That is, it is determined whether to perform or skip the transform on a given two-dimensional transform block without distinguishing the horizontal and vertical directions with respect to the given transform block.

However, as described above, since the characteristics of the image are often different from each other for each of the horizontal and vertical directions, there is a need for a technique capable of determining whether to skip or perform the transform independently for each of the horizontal and vertical directions.

For example, in the case that the transform block is determined to be 16×4 due to the characteristics of the image, when it is determined that the transform gain is sufficient in the horizontal direction having a size of 16 so that the transform is performed, but the transform gain is not sufficient in the vertical direction having a length of 4 so that it is not advantageous to perform the transform, it may be preferable that the transform is performed in the horizontal direction and the transform is not performed in the vertical direction. Therefore, it is necessary to find the conditions that the horizontal and vertical sizes of the transform block are separately included to determining the transform skip. In addition, it is necessary to effectively encode/decode the transform skip information independent of the horizontal and vertical directions. In addition, it is necessary to efficiently decode the compressed image information by performing or skipping transform independently in vertical and horizontal directions by using the encoded independent transform skip information in the horizontal and vertical directions thus decoded. Here, transform skipping may have the same meaning as transform skip.

The present invention has been devised to solve the technical problems.

A multiple transform, that is, a multiple transform selection (MTS) technique may be used for transforming an image.

The MTS technique may refer to a technique of applying various transforms to each of a horizontal direction and a vertical direction.

FIGS. 8 and 9 are diagrams illustrating an example of a multiple transform technique.

In FIG. 8 and FIG. 9, mts_cu_flag is information indicating whether the multiple transform technique is used. Here, mts_cu_flag may be referred to as multiple transform usage information.

For example, mts_cu_flag==0 may mean that different transform kernels may not be used for each of the horizontal and vertical directions, and mts_cu_flag==1 may mean that different transform kernels may be used for each of the horizontal and vertical directions. In addition, when mts_cu_flag==0, a transform kernel named DCT2 may be used in both the horizontal direction and the vertical direction.

Meanwhile, the multiple transform may be used in various combinations depending on the image characteristics.

FIG. 8 may show an example of multiple transforms applied to an intra block encoded by intra prediction.

In addition, FIG. 9 may show an example of multiple transforms applied to an inter block encoded by inter prediction.

In FIG. 8 and FIG. 9, mts_index is information transmitted only when multiple transform is used (that is, mts_cu_flag==1) and indicates different transform kernels for each of the horizontal and vertical directions. Here, mts_index may be referred to as multiple transform selection information.

Referring to FIGS. 8 and 9, mts_index is composed of 2 bits, and may represent four combinations of transform kernels applied to a horizontal direction and a vertical direction.

Meanwhile, the first bit and the second bit of two bits constituting mts_index may mean a transform kernel in a horizontal direction and a transform kernel in a vertical direction, respectively.

Thus, mts_index may be represented by a combination of MTS_Hor_flag and MTS_Ver_flag. Here, MTS_Hor_flag and MTS_Ver_flag may be information indicating a transform kernel in the horizontal direction and a transform kernel in the vertical direction, respectively.

Meanwhile, as shown in FIG. 10, when not using multiple transforms (cu_mts_flag==0), a transform skip flag (transform_skip_flag_hor/transform_skip_flag_ver) for each direction may be signaled.

Alternatively, as shown in FIG. 11, the present invention may be implemented so that a single transform skip flag is signaled. In this case, the transform skip flag for each direction may be set as follows.

transform_skip_flag_hor[x0][y0][cIdx]=transform_skip_flag[x0][y0][cIdx]

transform_skip_flag_ver[xz][y0][cIdx]=transform_skip_flag[x0][y0][cIdx]

Meanwhile, the encoder/decoder may signal a combination of whether transform skip is performed and multiple transform selection.

In examples of FIGS. 8 and 9, the transform skip information is additionally signaled when the multiple transform is not used, but an embodiment will be described hereinafter in which it is regarded that transform in which the transform kernel is an identity matrix (IDT) is performed at time of the transform skip.

In the present embodiment, the transform skip is substantially performed by causing transform using a transform kernel having an IDT to be selected without separately signaling transform skip information.

FIG. 12 is a diagram illustrating an embodiment in which a transform skip mode is represented as an IDT without signaling transform skip information.

Referring to FIG. 12, the transform skip mode may be represented by an IDT and thus represented by one transform kernel candidate of multiple transform. In detail, the transform skip information is merged into mts_Index, mts_index may indicate not only the transform kernel selection but also whether transform skip is performed or not.

FIG. 12 may be implemented as shown in FIG. 13.

Meanwhile, same_transform_hor_ver_flag, which is information indicating whether each of the horizontal transform and the vertical transform uses the same transform kernel, may be used.

FIGS. 14 and 15 are diagrams illustrating various embodiments in which information indicating whether a horizontal transform and a vertical transform each use the same transform kernel is used.

Referring to FIGS. 14 and 15, when same_transform_hor_ ver_flag=1, the same transform kernel is used in the horizontal transform and vertical transform, and thus, mts_index may indicate the transform kernel applied to both the horizontal transform and the vertical transform. On the contrary, when same_transform_hor_ver_flag=0, different transform kernels are used in the horizontal transform and vertical transform, and thus, mts_index may indicate transform kernels applied differently to the horizontal transform and the vertical transform.

Here, same_transform_hor_ver_flag may be represented by the above-described mts_cu_flag.

According to an embodiment of the present invention, the same_transform_hor_ver_flag may be signaled as one piece of information in combination with multiple transform selection information. That is, information indicating whether each of the horizontal transform and the vertical transform use the same transform kernel may be signaled in combination with the multiple transform selection information. Here, the multiple transform selection information may be expressed in an index format, and a specific index value of the multiple transform selection information may indicate whether the horizontal transform and the vertical transform each use the same transform kernel.

FIG. 16 is a diagram illustrating an embodiment of using both information (mts_cu_flag) indicating whether to use multiple transform and information (same_transform_hor_ ver_flag) indicating whether a horizontal transform and a vertical transform use the same transform kernel.

Referring to FIG. 16, when the multiple transform is not used (i.e., mts_cu_flag=0), DCT2 may be used for both the horizontal transform and the vertical transform.

In addition, when using multiple transform (mts_cu_ flag=1), information (same_transform_hor_ver_flag) indicating whether the horizontal transform and vertical transform use the same transform kernel and transform kernel selection information (mts_index) are signaled so that the horizontal and vertical transforms may be determined.

Hereinafter, an order of signaling information indicating whether to use multiple transform and transform skip information will be described.

FIGS. 17 and 18 are diagrams illustrating an embodiment in which transform skip information is signaled after information indicating whether to use multiple transform.

In FIG. 17 and FIG. 18, mts_cu_flag is information indicating whether multiple transforms are used, and transformskip_flag_hor and transformskip_flag_ver indicate horizontal transform skip information and vertical transform skip information, respectively. In addition, mts_hor_index and mts_ver_index may represent horizontal transform selection information and vertical transform selection information, respectively.

In FIG. 17, mts_cu_flag may be obtained first. When the value of mts_cu_flag is 0 (that is, when multiple transform is not used) and the condition for the size of the current block is satisfied (TU_size_condition_satisfied), transformskip_ flag_hor and transformskip_flag_ver may be obtained.

Meanwhile, when the value of mts_cu_flag is 1 (i.e, when multiple transform is used) and the condition for the size of the current block is satisfied (TU_size_condition_satisfied), transformskip_flag_hor and transformskip_flag_ver are obtained, and mts_hor_index and mts_ver_index may be obtained on the basis of the obtained transformskip_flag_hor and transformskip_flag_ver, respectively.

FIG. 18 is an example similar to FIG. 17, but shows an embodiment in which a condition for the size of the current block is separately applied as a condition for the horizontal size of the current block (TU_Ver_size_condition) and a condition for the vertical size of the current block (TU_Hor_size_condition). Specifically, when the condition for the horizontal size of the current block is satisfied (TU_Hor_size_condition_satisfied), transformskip_flag_hor may be obtained, and when the condition for the vertical size of the current block is satisfied (TU_Ver_size_condition_ satisfied), transformskip_flag_ver may be obtained.

Here, the condition (TU_size_condition) with respect the size of the current block may mean a condition of comparing the size of the current block with at least one of a minimum size in which transform skip is possible or a maximum size in which transform skip is possible.

As an example, when the horizontal size of the current block and the vertical size of the current block are less than or equal to the maximum size in which transform skip is possible, at least one of transform skip information and multiple transform selection information may be obtained. Here, the maximum size in which transform skip is possible may be derived by information that is determined by the encoder and then signaled to the decoder. Meanwhile, information on the maximum size in which the transform skip is possible may be signaled through a sequence parameter set, a picture parameter set, or a slice header.

Alternatively, the maximum size in which the transform skip is possible may be derived on the basis of the maximum transform block size. For example, the maximum size may be equal to the transform block maximum size or be ½ to the transform block maximum size.

As an example, when the horizontal size of the current block and the vertical size of the current block are less than or equal to a predetermined size, at least one of transform skip information and multiple transform selection information may be obtained.

As an example, when the horizontal size of the current block and the vertical size of the current block are smaller than or equal to a predetermined size and smaller than or equal to a maximum size in which transform skip is possible, at least one of transform skip information and multiple transform selection information may be obtained.

In the above embodiment, the predefined size may be 32.

Meanwhile, as shown in FIG. 18, a condition for comparing the horizontal size of the current block and the vertical size of the current block may be applied.

Here, the current block may be a transform block.

FIG. 19 is a diagram illustrating an embodiment in which information indicating whether to use multiple transform is signaled after signaling the transform skip information.

In FIG. 19, transformskip_flag_hor and transformskip_flag_ver may be obtained on the basis of whether the condition for the horizontal size of the current block is satisfied (TU_Hor_size_condition_satisfied) and whether the condition for the vertical size of the current block is satisfied (TU_Ver_size_condition_satisfied), respectively. In addition, when at least one of the values of transformskip_flag_hor and transformskip_flag_ver is 0 (that is, except when both a horizontal transform skip and a vertical transform skip are applied), mts_cu_flag may be obtained. When the value of mts_cu_flag is 0, the horizontal transform and the vertical transform are determined as DCT2, and when the value of mts_cu_flag is 1, mts_hor_idx and mts_ver_idx may be obtained on the basis of transformskip_flag_hor and transformskip_flag_ver, respectively.

FIG. 20 is a diagram illustrating an embodiment in which signaling of multiple transform usage information is determined on the basis of horizontal transform skip information and vertical transform skip information.

Referring to FIG. 20, when the values of transformskip_flag_hor and transformskip_flag_ver are all 1 (that is, when both horizontal transform skip and vertical transform skip are applied), it is determined that there is no possibility of MTS being to be performed, so that mts_cu_flag may not signaled. In the opposite case, however, it is determined that there is a possibility of the MTS being to be performed, so that mts_cu_flag may be signaled.

Meanwhile, the multiple transform selection information may be signaled after signaling the transform skip information.

The above-described embodiments according to the present invention are applied to both the luma channel and the chroma channel in the same way or independently of each other.

As an example, at least one of the transform skip and the multiple transform may be applied only to the luma channel and not to the chroma channel. As another example, transform skip may be applied to the chroma and luma channels, and multiple transform may be applied only to the luma channel.

In addition, the above-described embodiment according to the present invention may be independently applied to each channel (for example, RGB, YUV, YCbCr, etc.) of the image.

In addition, the method and apparatus of the present invention devised to solve the problems described above may be equally applied to channels of an image (e.g., RGB, YUV, YCbCr, etc.).

According to an embodiment of the present invention, information for determining whether to perform transform may be signaled as one piece of information in combination with transform selection information. That is, the transform skip information may be signaled in combination with the transform selection information. Here, the transform selection information may be expressed in an index format, and a specific index value of the transform selection information may indicate that the transform is not performed.

For example, when the transform selection information is a value of 0, it may represent that the transform is not performed.

Meanwhile, the present embodiment may be applied to each of the horizontal transform and the vertical transform, or may be applied to each of the primary transform and the secondary transform.

Figure 21:
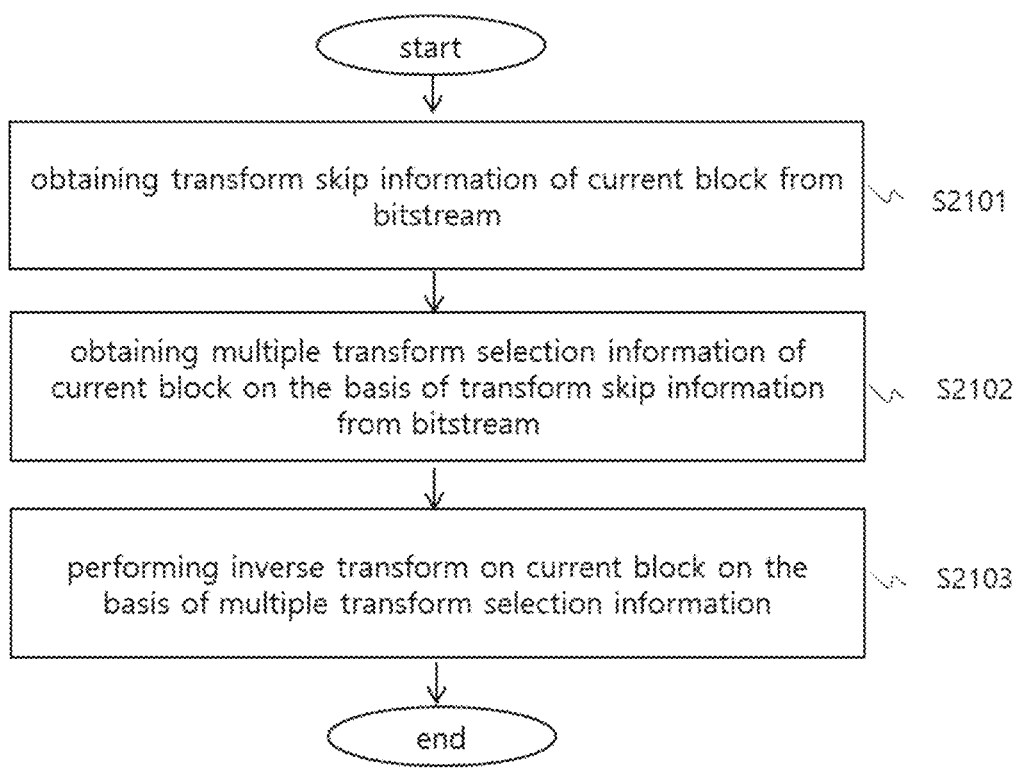
FIG. 21 is a flowchart illustrating an image decoding method according to an embodiment of the present invention.

FIG. 21 is a flowchart illustrating an image decoding method according to an embodiment of the present invention.

Referring to FIG. 21, the image decoding apparatus may obtain transform skip information of the current block from the bitstream (S2101). Here, the transform skip information may be the above-described transform_skip_flag.

Meanwhile, the transform skip information may include horizontal transform skip information and vertical transform skip information.

Meanwhile, in step S2101, the transform skip information of the current block may be obtained when the horizontal size and the vertical size of the current block is less than or equal to the predetermined size. Here, the predetermined size may be 32.

In addition, in step S2101, the maximum transform skip size information may be obtained from the bitstream, and when the horizontal and vertical sizes of the current block are less than or equal to the maximum transform skip size, the transform skip information of the current block may be obtained.

In addition, the image decoding apparatus may obtain multiple transform selection information of the current block on the basis of transform skip information from the bitstream (S2102). Here, the multiple transform selection information may be the aforementioned mts_index. Specifically, when transform skip information indicates that transform skip is not applied, multiple transform selection information of the current block may be obtained.

Meanwhile, the multiple transform selection information may be used to set the horizontal transform type and the vertical transform type, respectively. Here, the transform type may be the above-described transform kernel.

Meanwhile, the multiple transform selection information may indicate whether the horizontal transform type and the vertical transform type are the same.

Meanwhile, the multiple transform selection information may be index information indicating a transform type set applied to the horizontal transform type and the vertical transform type.

In addition, the image decoding apparatus may perform inverse transform on the current block on the basis of the multiple transform selection information (S2103).

Figure 22:
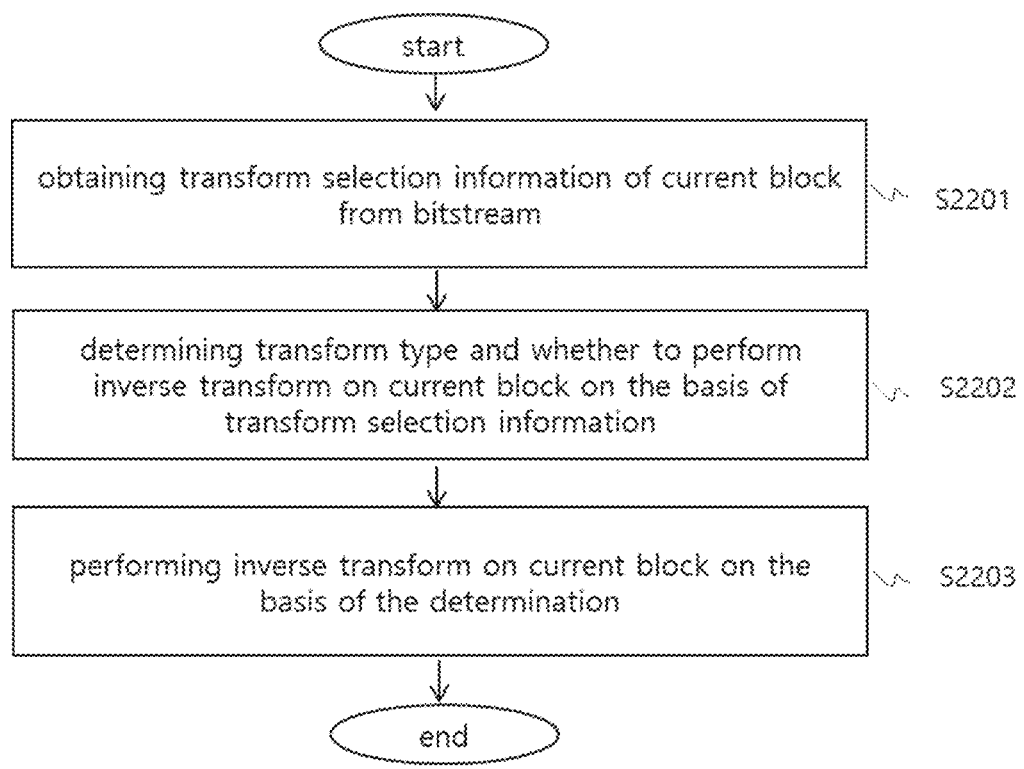
FIG. 22 is a flowchart illustrating an image decoding method according to an embodiment of the present invention.

FIG. 22 is a flowchart illustrating an image decoding method according to an embodiment of the present invention.

Referring to FIG. 22, the image decoding apparatus may obtain transform selection information of the current block from the bitstream (S2201).

In addition, the image decoding apparatus may determine a transform type and whether to perform inverse transform on the current block on the basis of the transform selection information (S2202). That is, the transform selection information may include all information on whether to perform the transform and information on transform type selection.

In addition, the image decoding apparatus may perform inverse transform on the current block according to the determination of step S2202 (S2203).

Here, the inverse transform may be a secondary inverse transform performed between inverse quantization and the first inverse transform.

Figure 23:
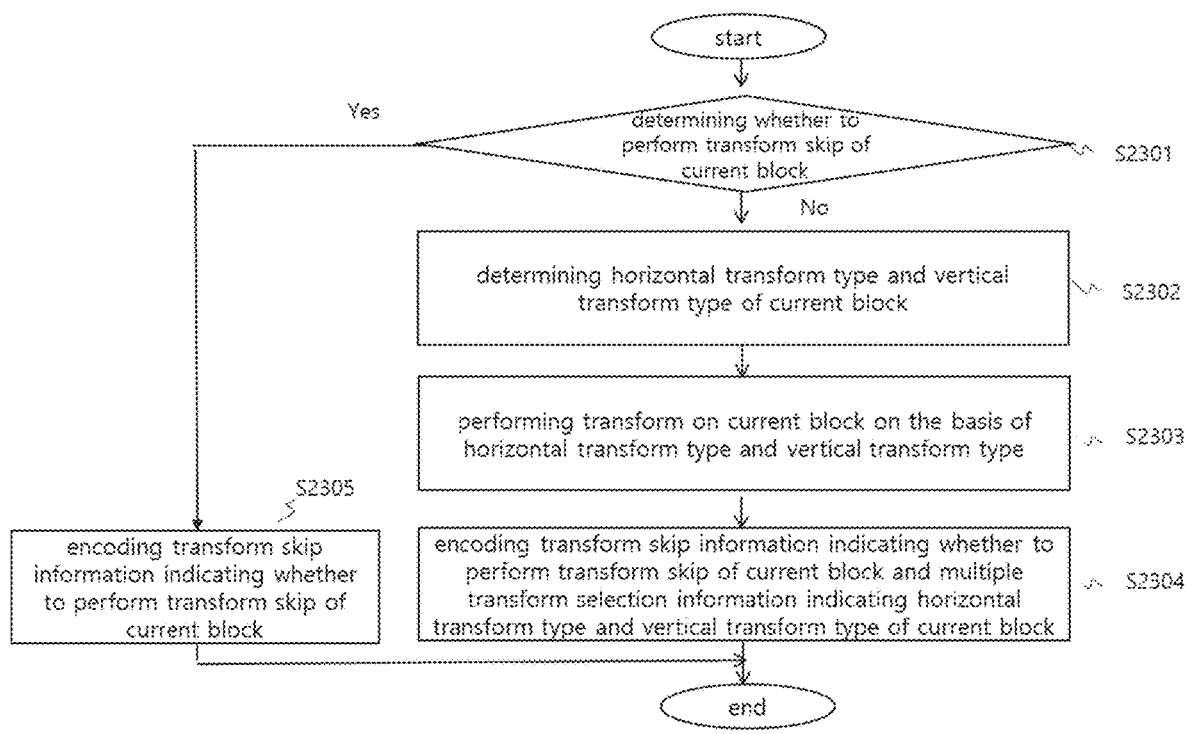
FIG. 23 is a flowchart illustrating an image encoding method according to an embodiment of the present invention.

FIG. 23 is a flowchart illustrating an image encoding method according to an embodiment of the present invention.

Referring to FIG. 23, the image encoding apparatus may determine whether to perform transform skip of the current block (S2301).

When the transform skip is not performed on the current block (S2301-No), the image encoding apparatus may determine a horizontal transform type and a vertical transform type of the current block (S2302).

In addition, the image encoding apparatus may perform transform on the current block on the basis of the horizontal transform type and the vertical transform type (S2303).

In addition, the image encoding apparatus may encode transform skip information indicating whether to perform transform skip of the current block and multiple transform selection information indicating a horizontal transform type and a vertical transform type of the current block (S2304).

Here, the multiple transform selection information may indicate whether the horizontal transform type and the vertical transform type are the same.

In addition, the multiple transform selection information may be index information indicating a set of transform types applied to a horizontal transform type and a vertical transform type Meanwhile, the image encoding apparatus may not encode transform skip information of the current block when the horizontal size and the vertical size of the current block are smaller than or equal to a predetermined size.

Here, the transform skip information may include horizontal transform skip information and vertical transform skip information.

Meanwhile, when the transform skip is performed on the current block (S2301—Yes), the image encoding apparatus may encode transform skip information indicating whether to perform the transform skip of the current block (S2305).

Figure 24:
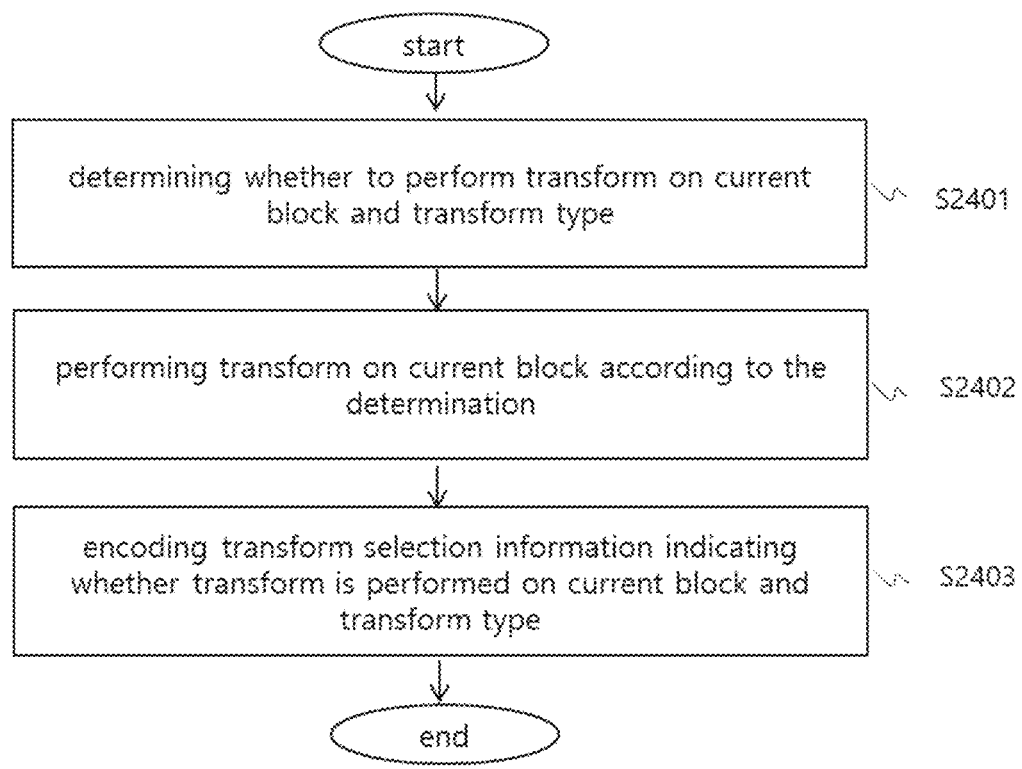
FIG. 24 is a flowchart illustrating an image encoding method according to an embodiment of the present invention.

FIG. 24 is a flowchart illustrating an image encoding method according to an embodiment of the present invention.

Referring to FIG. 24, the image encoding apparatus may determine whether to perform the transform on the current block and a transform type (S2401).

In addition, the image encoding apparatus may perform transform on the current block according to the determination of step S2401 (S2402). Here, the transform may be secondary transform performed between the primary transform and the quantization.

In addition, the image encoding apparatus may encode transform selection information indicating whether the transform is performed on the current block and a transform type (S2403).

The bitstream generated by the image encoding method according to the present invention may be temporarily stored in a computer-readable non-transitory recording medium, and may be decoded by the above-described image decoding method.

Specifically, in a non-transitory computer readable recording medium including a bitstream decoded by an image decoding apparatus, the bitstream includes transform skip information of the current block and multiple transform selection information of the current block, and transform skip information indicates whether the inverse transform is performed on the current block, the multiple transform selection information indicates a horizontal transform type and a vertical transform type applied to the inverse transform of the current block, and in the image decoding apparatus, the multiple transform selection information is obtained on the basis of the transform skip information.

The invention claimed is:

1. A method of decoding an image, the method comprising:
    obtaining transform skip information of a current block from a bitstream;
    obtaining multiple transform selection information of the current block on the basis of the transform skip information from the bitstream; and
    performing inverse transform on the current block on the basis of the multiple transform selection information,
    wherein the multiple transform selection information is used to set each of a horizontal transform type and a vertical transform type,
    wherein the transform skip information is used for both a luma component and a chroma component, and
    wherein the multiple transform selection information is used only for the luma component.

2. The method of claim 1, wherein the multiple transform selection information indicates whether the horizontal transform type and the vertical transform type are the same.

3. The method of claim 1, wherein the multiple transform selection information is index information indicating a transform type set applied to the horizontal transform type and the vertical transform type.

4. The method of claim 1, wherein the acquiring of the transform skip information of the current block includes:
    obtaining transform skip information of the current block when a horizontal size and a vertical size of the current block are less than or equal to a predetermined size.

5. The method of claim 4, wherein the acquiring of the transform skip information of the current block includes:
    obtaining maximum transform skip size information from the bitstream; and
    obtaining transform skip information of the current block when the horizontal size and the vertical size of the current block are less than or equal to the maximum transform skip size.

6. The method of claim 1, wherein the transform skip information includes horizontal transform skip information and vertical transform skip information.

7. A method of encoding an image, the method comprising:
    determining whether to perform transform skip of the current block;
    when the transform skip is not performed on the current block, determining a horizontal transform type and a vertical transform type of the current block;
    performing the transform on the current block on the basis of the horizontal transform type and the vertical transform type; and
    encoding transform skip information indicating whether to perform the transform skip of the current block and multiple transform selection information indicating the horizontal transform type and the vertical transform type of the current block,
    wherein the transform skip information is used for both a luma component and a chroma component, and
    wherein the multiple transform selection information is used only for the luma component.

8. The method of claim 7, wherein the multiple transform selection information indicates whether the horizontal transform type and the vertical transform type are the same.

9. The method of claim 7, wherein the multiple transform selection information is index information indicating a transform type set applied to the horizontal transform type and the vertical transform type.

10. The method of claim 7, wherein the transform skip information of the current block is not encoded when the horizontal size and the vertical size of the current block are less than or equal to a predetermined size.

11. The method of claim 7, wherein the transform skip information includes horizontal transform skip information and vertical transform skip information.

12. A non-transitory computer readable recording medium storing a bitstream decoded by an image decoding apparatus,
- wherein the bitstream includes transform skip information of a current block and multiple transform selection information of the current block;
- the transform skip information indicates whether inverse transform is performed on the current block;
- the multiple transform selection information indicates a horizontal transform type and a vertical transform type applied to inverse transform of the current block; and
- the image decoding apparatus obtains the multiple transform selection information on the basis of the transform skip information,
- wherein the transform skip information is used for both a luma component and a chroma component, and
- wherein the multiple transform selection information is used only for the luma component.

\* \* \* \* \*